(12) United States Patent
Petri

(10) Patent No.: US 8,196,100 B2
(45) Date of Patent: Jun. 5, 2012

(54) CONTENT MANAGEMENT SYSTEM FOR COMPUTER SOFTWARE WITH DYNAMIC TRACEABILITY BETWEEN CODE AND DESIGN DOCUMENTS

(75) Inventor: John Edward Petri, Lewiston, MN (US)

(73) Assignee: International Business Machines Corporation, Armonk, NY (US)

( * ) Notice: Subject to any disclaimer, the term of this patent is extended or adjusted under 35 U.S.C. 154(b) by 1207 days.

(21) Appl. No.: 11/697,431

(22) Filed: Apr. 6, 2007

(65) Prior Publication Data

US 2008/0250392 A1    Oct. 9, 2008

(51) Int. Cl.
*G06F 9/44* (2006.01)
(52) U.S. Cl. ......... 717/120; 717/122; 717/123; 717/101
(58) Field of Classification Search .................. 717/120, 717/122, 123, 128, 101
See application file for complete search history.

(56) References Cited

U.S. PATENT DOCUMENTS

| | | | | |
|---|---|---|---|---|
| 5,907,705 A * | 5/1999 | Carter | ............................ | 717/122 |
| 6,336,217 B1 * | 1/2002 | D'Anjou et al. | .............. | 717/121 |
| 6,343,297 B1 * | 1/2002 | D'Anjou et al. | ...................... | 1/1 |
| 6,766,334 B1 * | 7/2004 | Kaler et al. | ............................ | 1/1 |
| 6,826,726 B2 * | 11/2004 | Hsing et al. | .................... | 715/234 |
| 6,978,281 B1 * | 12/2005 | Kruy et al. | ............................ | 1/1 |
| 7,127,475 B2 * | 10/2006 | Gotz et al. | ............................ | 1/1 |
| 7,131,112 B1 * | 10/2006 | Bartz et al. | .................... | 717/122 |
| 7,735,068 B2 * | 6/2010 | Siddaramappa et al. | ..... | 717/128 |
| 2002/0170048 A1 * | 11/2002 | Zgarba et al. | ................. | 717/168 |
| 2002/0184264 A1 * | 12/2002 | Berg et al. | ..................... | 707/513 |
| 2005/0050520 A1 * | 3/2005 | Motoyama et al. | ........... | 717/123 |
| 2006/0206865 A1 * | 9/2006 | Reinhardt et al. | ............ | 717/108 |
| 2007/0016887 A1 * | 1/2007 | Kaler et al. | .................... | 717/101 |
| 2007/0209031 A1 * | 9/2007 | Ortal et al. | ..................... | 717/104 |
| 2008/0040397 A1 * | 2/2008 | Herbeck et al. | ............... | 707/201 |
| 2008/0250394 A1 * | 10/2008 | Jones et al. | .................... | 717/123 |
| 2008/0263505 A1 * | 10/2008 | StClair et al. | .................... | 717/101 |
| 2010/0162200 A1 * | 6/2010 | Kamiyama et al. | ........... | 717/101 |

* cited by examiner

*Primary Examiner* — Emerson Puente
*Assistant Examiner* — Charles Swift
(74) *Attorney, Agent, or Firm* — Martin & Associates LLC; Derek P. Martin

(57) ABSTRACT

A content management system (CMS) for computer software provides automatic notification and correlation of changes in a design document with corresponding code, and provides automatic notification and correlation of changes in the code with one or more corresponding design documents. Traceability rules are defined that correlate which portions of the code correspond to which portions of the design document. A traceability update policy governs whether interested parties are notified of a change to either the design document or the corresponding code, and whether the change to one causes an automatic update to the other. The result is a content management system that helps keep the code and corresponding design documents consistent with each other so the system has accurate and consistent information at all times.

20 Claims, 11 Drawing Sheets

```
package com.xyz.app;

/**
 * This interface represents a document in the code repository.
 */
public interface DocumentInterface {
   /**
    * Checks out the document from the repository.
    */
   public void checkout();

/**
    * Checks in the document.
    */
   public void checkin();

/**
    * Gets the document's content.
    */
   public InputStream getContent();

/**
    * Sets the document's content.
    */
   public void setContent(InputStream in);
}
```

1.1.1 Document Interfaces
The XYZ application can access documents stored in a repository. To facilitate programmatic access to a document and its features, the following interface has been defined. When another class requests to work with a document from the repository through the XYZ API, the XYZ application will return an instance of this interface.

1.1.1.1 DocumentInterface
```
/**
 * This interface represents a document in the repository.
 */
public interface DocumentInterface {
    /**
     * Checks out the document from the repository.
     */
    public void checkout();

/**
     * Checks in the document.
     */
    public void checkin();

/**
     * Gets the document's content.
     */
    public InputStream getContent();
}
```

FIG. 6

```
<TraceabilityRules>
    <Mapping>
        <Code project="XYZApplication"
                class="com.xyz.app.DocumentInterface">
            <Method name="checkout_code"
                    signature="public void checkout()"
                    traceTo="checkout_design" />
            <Method name="checkin_code"
                    signature="public void checkin()"
                    traceTo="checkin_design" />
            <Method name="getContent_code"
                    signature="public InputStream getContent()"
                    traceTo="getContent_design" />
        </Code>
        <Design document="/XYZApplication/XML_content_management_design.doc">
            <Section title="1.1.1.1 DocumentInterface">
                <TraceableObject
                        id="public interface com.xyz.app.DocumentInterface">
                    <TraceableObject name="checkout_design"
                            id="public void checkout()"
                            traceTo="checkout_code" />
                    <TraceableObject name="checkin_design"
                            id="public void checkin()"
                            traceTo="checkin_code" />
                    <TraceableObject
                            name="getContent_design"
                            id="public InputStream getContent()"
                            traceTo="getContent_code" />
                </TraceableObject>
            </Section>
        </Design>
    </Mapping>
</TraceabilityRules>
```

700

710 (checkout/checkin/getContent code methods)

720 (getContent_design TraceableObject)

FIG. 7

| Traceability Update Policy | |
|---|---|
| Send Notifications to Interested Parties | YES |
| Automatically Update Corresponding Design or Code Sections | YES |
| Indicate Traceable Objects via the Plug-in | YES |

```
package com.xyz.app;

/**
 * This interface represents a document in the code repository.
 */
public interface DocumentInterface {
   /**
    * Checks out the document from the repository.
    */
   public void checkout();

/**
    * Checks in the document.
    */
   public void checkin();                                            910

/**
    * Gets the document's content.  {note to developers: the implementing
    * class will be responsible for freeing any memory allocated to content}
    */
   public InputStream getContentStream();  ——— 920

/**
    * Sets the document's content.
    */
   public void setContent(InputStream in);
}
```

1.1.1 Document Interfaces
The XYZ application can access documents stored in a repository. To facilitate programmatic access to a document and its features, the following interface has been defined. When another class requests to work with a document from the repository through the XYZ API, the XYZ application will return an instance of this interface.

1.1.1.1 DocumentInterface

```
/**
 * This interface represents a document in the repository.
 */
public interface DocumentInterface {
  /**
   * Checks out the document from the repository.
   */
  public void checkout();

/**
   * Checks in the document.
   */
  public void checkin();

/**
   * Gets the document's content.
   */
  public InputStream getContentStream();        —— 1010
}
```

FIG. 10

1.1.1 Document Interfaces
The XYZ application can access documents stored in a repository. To facilitate programmatic access to a document and its features, the following _new and improved_ interface has been defined. When another class requests to work with a document from the repository through the XYZ API, the XYZ application will return an instance of this interface.

1.1.1.1 DocumentInterface
```
/**
 * This interface represents a document in the repository.
 */
public interface DocumentInterface {
    /**
     * Checks out the document from the repository.
     */
    public void checkout();

/**
     * Checks in the document.
     */
    public void checkin();

/**
     * Gets the document's content.
     */
    public InputStream getContentStream2();        —— 1120
}
```

FIG. 11

```
package com.xyz.app;

/**
 * This interface represents a document in the code repository.
 */
public interface DocumentInterface {
   /**
    * Checks out the document from the repository.
    */
   public void checkout();

/**
    * Checks in the document.
    */
   public void checkin();

/**
    * Gets the document's content.
    */
   public InputStream getContentStream2();   —— 1210

/**
    * Sets the document's content.
    */
   public void setContent(InputStream in);
}
```

FIG. 12

CONTENT MANAGEMENT SYSTEM FOR COMPUTER SOFTWARE WITH DYNAMIC TRACEABILITY BETWEEN CODE AND DESIGN DOCUMENTS

BACKGROUND

1. Technical Field

This disclosure generally relates to content management systems, and more specifically relates to a content management system for computer software that maintains traceability between code and design documents.

2. Background Art

A content management system (CMS) allows many users to efficiently share electronic content such as text, audio files, video files, pictures, graphics, etc. Content management systems typically control access to content in a repository. A user may generate content, and when the content is checked into the repository, the content is checked by the CMS to make sure the content conforms to predefined rules. A user may also check out content from the repository, or link to content in the repository while generating content. The rules in a CMS assure that content to be checked in or linked to meets desired criteria specified in the rules.

Known content management systems check their rules when content is being checked in. If the rule is satisfied, the content is checked into the repository. If the rule is not satisfied, the content is not checked into the repository. Known content management systems may include rules related to bursting, linking, and synchronization. Bursting rules govern how a document is bursted, or broken into individual chunks, when the document is checked into the repository. By bursting a document into chunks, the individual chunks may be potentially reused later by a different author. Linking rules govern what content in a repository a user may link to in a document that will be subsequently checked into the repository. Synchronization rules govern synchronization between content and metadata related to the content. For example, a synchronization rule may specify that whenever a specified CMS attribute is changed, a particular piece of XML in the content should be automatically updated with that attribute's value.

Specialized content management systems may be used for the development of computer software in a highly-regulated environment where traceability of changes is critical. For example, in the pharmaceutical industry, FDA regulations require that changes to computer software be traceable, i.e., well-documented. In many modern software development environments, there are design documents and there is code that is separate from the design documents. The design documents are human-readable documents that provide a description of the design of the code. The code is more cryptic, typically in a high level computer language, and implements the functions described in the corresponding design document. Thus, there is a direct relationship between a design document and the code corresponding to the design document.

Potential problems may arise in a highly-regulated environment if changes to a design document are not properly reflected in the code, or if changes to the code are not properly reflected in the design document. Known systems require a programmer to remember that changes to one affect the other, and rely upon the programmer to maintain the correlation between the two. If a programmer makes a change to either the code or the design document, and forgets to make the corresponding change to the other, the code and design document will now be inconsistent with each other. As a result, if an audit is performed to determine whether the code and design document are consistent, the inconsistencies between the two will be discovered.

Because known content management systems for computer software rely upon human programmers to remember to make appropriate changes to both code and corresponding design documents, these content management systems are prone to human errors. Without a way to automate the process of keeping the code and related design document(s) consistent with each other, known content management systems will continue to suffer from human errors when programmers make the mistake of changing either the code or the design document without reflecting the change in the other.

BRIEF SUMMARY

A content management system (CMS) for computer software provides automatic notification and correlation of changes in a design document with corresponding code, and provides automatic notification and correlation of changes in the code with one or more corresponding design documents. Traceability rules are defined that correlate which portions of the code correspond to which portions of the design document. A traceability update policy governs whether interested parties are notified of a change to either the design document or the corresponding code, and whether the change to one causes an automatic update to the other. The result is a content management system that helps keep the code and corresponding design documents consistent with each other so the system has accurate and consistent information at all times.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 5 is a sample interface that represents code stored in the code repository in FIG. 2;

FIG. 6 is a sample portion of a design document stored in the design document repository in FIG. 2 that corresponds to the sample code shown in FIG. 5;

FIG. 7 shows sample traceability rules that correlate portions of the code in FIG. 5 to corresponding portions of the design document in FIG. 6;

FIG. 8 shows a sample traceability update policy;

FIG. 9 shows the sample code in FIG. 5 after changes shown at 910 and 920;

FIG. 10 shows the corresponding document 600 in FIG. 6 after the document 600 has been automatically updated to reflect the change to the code shown in FIG. 9;

FIG. 11 shows the sample design document 600 in FIG. 6 after adding text at 1110 and changing the name of one of the methods at 1120; and FIG. 12 shows the corresponding code 500 in FIG. 5 after the code 500 has been automatically updated to reflect the change to the design document shown in FIG. 11.

DETAILED DESCRIPTION

The claims and disclosure herein provide a content management system (CMS) for computer software that enforces correlations between code and design documents by providing either notification of changes or automatic updates. When code is changed, one or more parties may be notified of the change to the code so a corresponding change to the design document may be made. In addition, the change to the code may be automatically reflected in the design document. When a design document is changed, one or more parties may be notified of the change to the design document so a corresponding change to the design document may be made. In addition, the change to the design document may be automatically reflected in the code. This two-way correlation between code and a design document provides traceability for changes to either by assuring they are reflected in both.

Many known content management systems use extensible markup language (XML) due to its flexibility and power in managing diverse and different types of content. One known content management system that uses XML is Solution for Compliance in a Regulated Environment (SCORE) developed by IBM Corporation. XML is growing in popularity, and is quickly becoming the preferred format for authoring and publishing. While the disclosure herein discusses XML documents as one possible example of content that may be managed by a content management system, the disclosure and claims herein expressly extend to content management systems that do not use XML.

Figure 1:
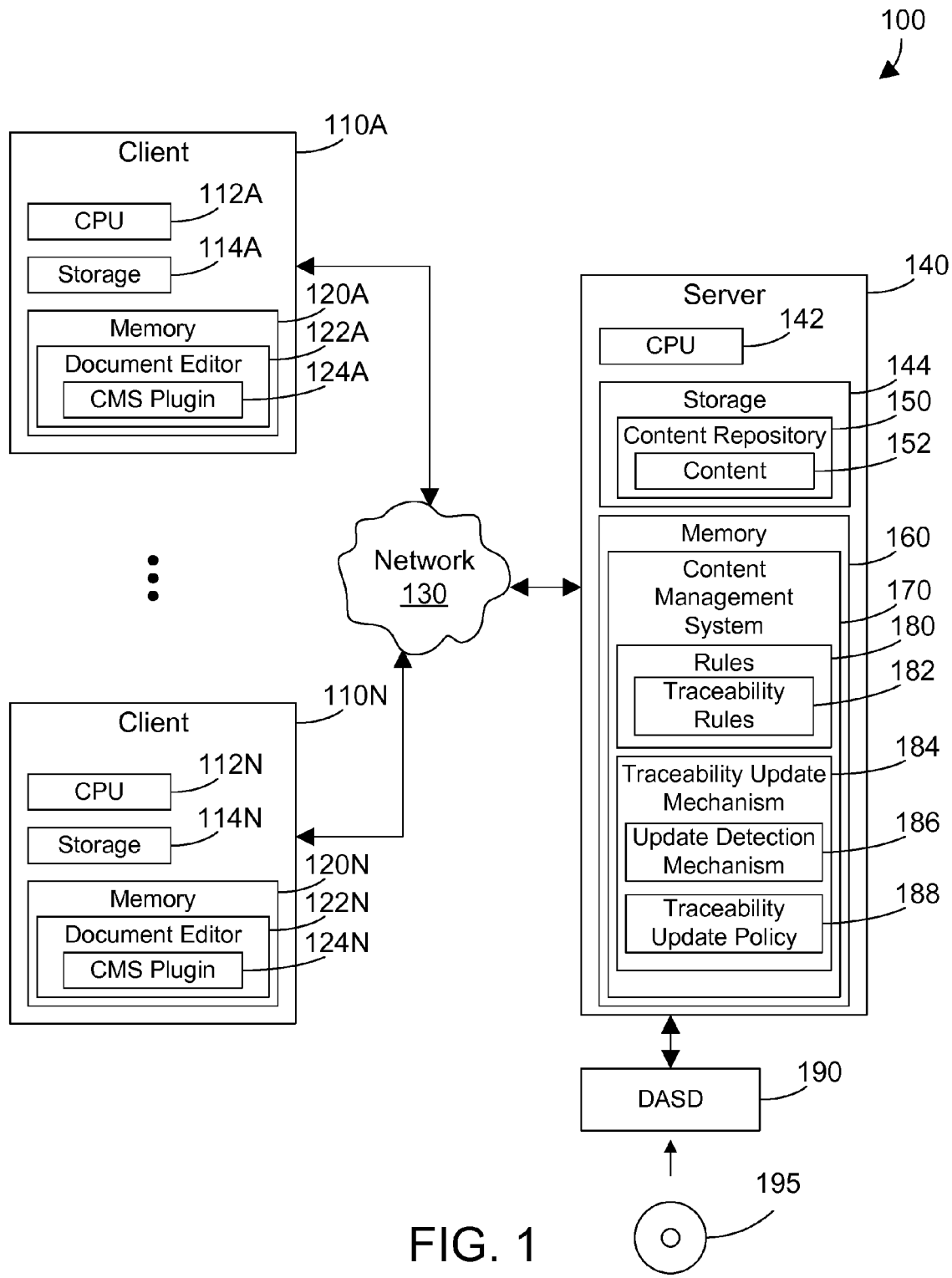
FIG. 1 is a block diagram of a networked computer system that includes a server computer system that has a content management system that includes traceability rules and a traceability update mechanism that monitors changes to code and corresponding design documents and performs one or more specified functions when either change.

Referring to FIG. 1, networked computer system 100 includes multiple clients, shown in FIG. 1 as clients 110A, . . . , 110N, coupled to a network 130. Each client preferably includes a CPU, storage, and memory that contains a document editor and a content management system (CMS) plugin. Thus, client 110A includes a CPU 112A, storage 114A, memory 120A, a document editor 122A in the memory 120A that is executed by the CPU 112A, and a CMS plugin 124A that allows the document editor 122A to interact with content 152 in the repository 150 that is managed by the CMS 170 in server 140. In similar fashion, other clients have similar components shown in client 110A, through client 110N, which includes a CPU 112N, storage 114N, memory 120N, a document editor 122N, and a CMS plugin 124N.

The CMS 170 resides in the main memory 160 of a server computer system 140 that also includes a CPU 142 and storage 144 that includes a content repository 150 that holds content 152 managed by the CMS 170. One example of a suitable server computer system 140 is an IBM eServer System i computer system. However, those skilled in the art will appreciate that the disclosure herein applies equally to any type of client or server computer systems, regardless of whether each computer system is a complicated multi-user computing apparatus, a single user workstation, or an embedded control system. CMS 170 includes rules 180 and traceability update mechanism 184. Rules 180 may include bursting rules, linking rules, and synchronization rules. Of course, other rules, whether currently known or developed in the future, could also be included in rules 180. In addition, traceability rules 182 provide a correlation between computer code and corresponding design documents so changes to one may be traced to corresponding changes to the other. Traceability update mechanism 184 maps the changes from code to corresponding changes in the design document, and maps the changes from the design document to corresponding changes in the code. An update detection mechanism 186 detects when a change is made to either code that has a corresponding design document, or a design document that has corresponding code. A traceability update policy 188 determines the actions the traceability update mechanism 184 performs when a change is made to either code or a design document.

In FIG. 1, repository 150 is shown separate from content management system 170. In the alternative, repository 150 could be within the content management system 170. Regardless of the location of the repository 150, the content management system 170 controls access to content 152 in the repository 150. The repository 150 is shown to include content 152. While the content may include both code and design documents in the same repository, the disclosure and claims herein also extend to using multiple repositories in multiple content management systems as well.

Server computer system 140 may include other features of computer systems that are not shown in FIG. 1 but are well-known in the art. For example, server computer system 140 preferably includes a display interface, a network interface, and a mass storage interface to an external direct access storage device (DASD) 190. The display interface is used to directly connect one or more displays to server computer system 140. These displays, which may be non-intelligent (i.e., dumb) terminals or fully programmable workstations, are used to provide system administrators and users the ability to communicate with server computer system 140. Note, however, that while a display interface is provided to support communication with one or more displays, server computer system 140 does not necessarily require a display, because all needed interaction with users and other processes may occur via the network interface.

The network interface is used to connect the server computer system 140 to multiple other computer systems (e.g., 110A, . . . , 110N) via a network, such as network 130. The network interface and network 130 broadly represent any suitable way to interconnect electronic devices, regardless of whether the network 130 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

The mass storage interface is used to connect mass storage devices, such as a direct access storage device 190, to server computer system 140. One specific type of direct access storage device 190 is a readable and writable CD-RW drive, which may store data to and read data from a CD-RW 195.

Main memory 160 preferably contains data and an operating system that are not shown in FIG. 1. A suitable operating system is a multitasking operating system known in the industry as i5/OS; however, those skilled in the art will appreciate that the spirit and scope of this disclosure is not limited to any one operating system. In addition, server computer system 140 utilizes well known virtual addressing mechanisms that allow the programs of server computer system 140 to behave as if they only have access to a large, single storage entity instead of access to multiple, smaller storage entities such as main memory 160, storage 144 and DASD device 190. Therefore, while data, the operating system, and content management system 170 may reside in main memory 160, those skilled in the art will recognize that these items are not necessarily all completely contained in main memory 160 at the same time. It should also be noted that the term "memory" is used herein generically to refer to the entire virtual memory of server computer system 140, and may include the virtual memory of other computer systems coupled to computer system 140.

CPU 142 may be constructed from one or more microprocessors and/or integrated circuits. CPU 142 executes program instructions stored in main memory 160. Main memory 160 stores programs and data that CPU 142 may access. When computer system 140 starts up, CPU 142 initially executes the program instructions that make up the operating system.

Although server computer system 140 is shown to contain only a single CPU, those skilled in the art will appreciate that a content management system 170 may be practiced using a computer system that has multiple CPUs. In addition, the interfaces that are included in server computer system 140 (e.g., display interface, network interface, and DASD interface) preferably each include separate, fully programmed microprocessors that are used to off-load compute-intensive processing from CPU 142. However, those skilled in the art will appreciate that these functions may be performed using I/O adapters as well.

At this point, it is important to note that while the description above is in the context of a fully functional computer system, those skilled in the art will appreciate that the content management system 170 may be distributed as an article of manufacture in a variety of forms, and the claims extend to all suitable types of computer-readable media used to actually carry out the distribution, including recordable media such as floppy disks and CD-RW (e.g., 195 of FIG. 1).

The traceability update mechanism may also be delivered as part of a service engagement with a client corporation, nonprofit organization, government entity, internal organizational structure, or the like. This may include configuring a computer system to perform some or all of the methods described herein, and deploying software, hardware, and web services that implement some or all of the methods described herein. This may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

Figure 2:
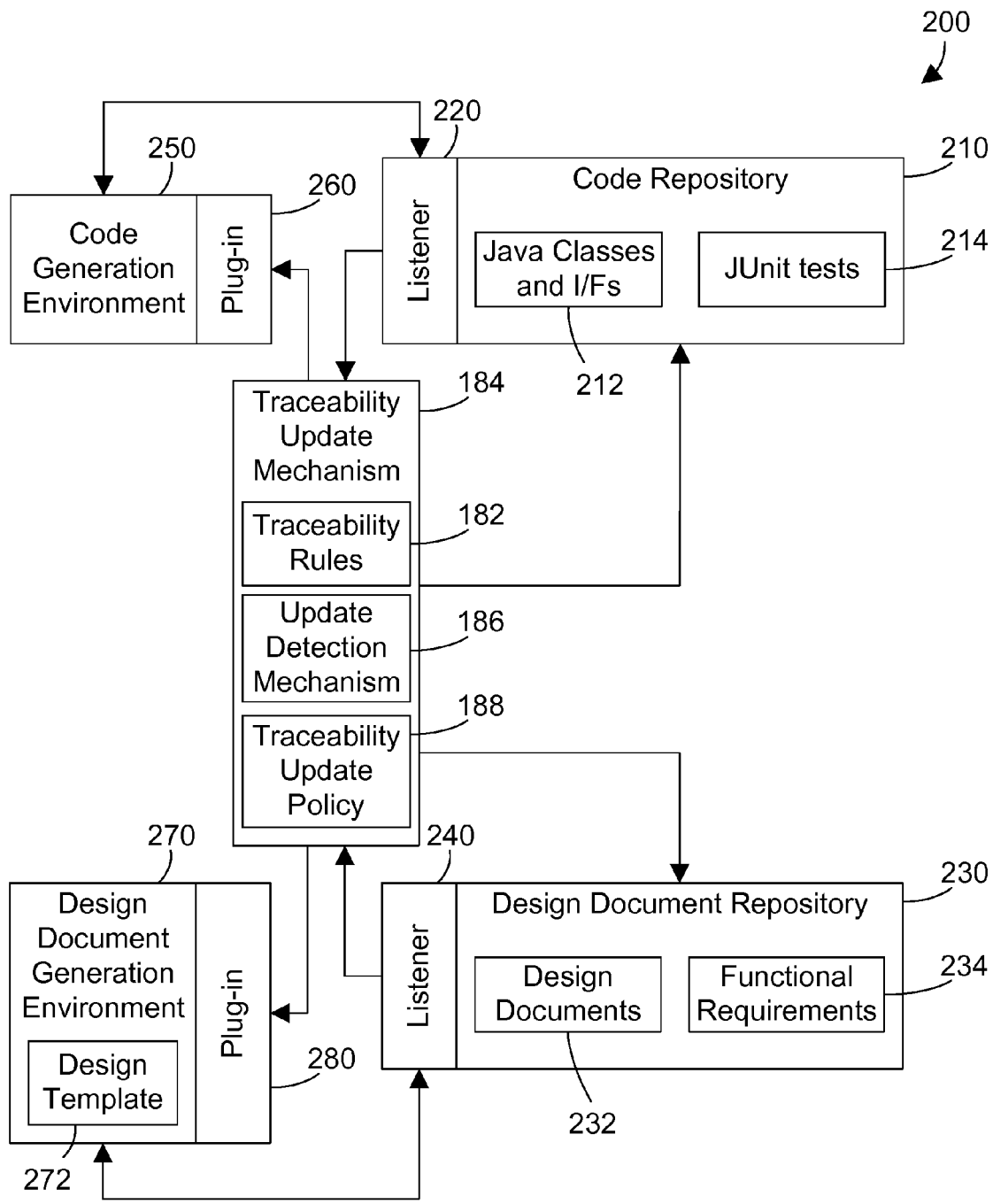
FIG. 2 is a logical block diagram of interactions in a content management system that is specialized for computer software.

Referring to FIG. 2, a system 200 shows a block diagram logical view of a sample implementation with the scope of the disclosure and claims herein. System 200 includes additional details not shown in FIG. 1 that are discussed further below. System 200 includes a code generation environment 250 that allows a programmer to write code to be stored in the code repository 210. Code generation environment 250 includes a plug-in 260 that is used to indicate which parts of the code are tied to the design documents, and the current state of those relationships, such as valid or invalid. The code repository 210 preferably includes Java classes and interfaces 212 and JUnit tests 214. JUnit tests 214 represent classes to facilitate automated functional testing of code based on a set of requirements, or expectations for how the code is supposed to work. Basically, the developer writes their normal code according to the design, which is based on user and/or functional requirements, then the developer may write JUnit classes as a way to automate the testing of their code so that they can make sure the requirements are met. Note that the term "code" as used herein broadly includes any suitable way to control the function of a computer system. The Java classes and interfaces 212 and JUnit tests 214 are shown in FIG. 2 as two suitable examples of code, but many others are within the scope of the disclosure and claims herein. The code repository 210 also includes a listener 220 that informs the traceability update mechanism 184 when changes are made to code in the code repository 210.

System 200 also includes a design document generation environment 270 that allows a programmer or other user to generate a design document to be stored in a design document repository 230. The design document generation environment 270 may include one or more design templates 272 that provide a starting point for generating a design document. The design document generation environment 270 also includes a plug-in 280 that reads the traceability rules 182 and validates the data entered by the author as the author enters the data in a design document. By dynamically enforcing the traceability rules as an author generates a design document, system 200 assures the design documents comply with the traceability rules. The design document repository 230 preferably includes design documents 232 and functional requirements 234. Note that the term "design document" as used herein broadly includes any suitable way to document the function of a computer system. The design documents 232 and functional requirements 234 are two suitable examples of design documents, but many others are within the scope of the disclosure and claims herein. The design document repository 230 also includes a listener 240 that informs the traceability update mechanism 184 when changes are made to documents in the design document repository 230.

Figure 3:
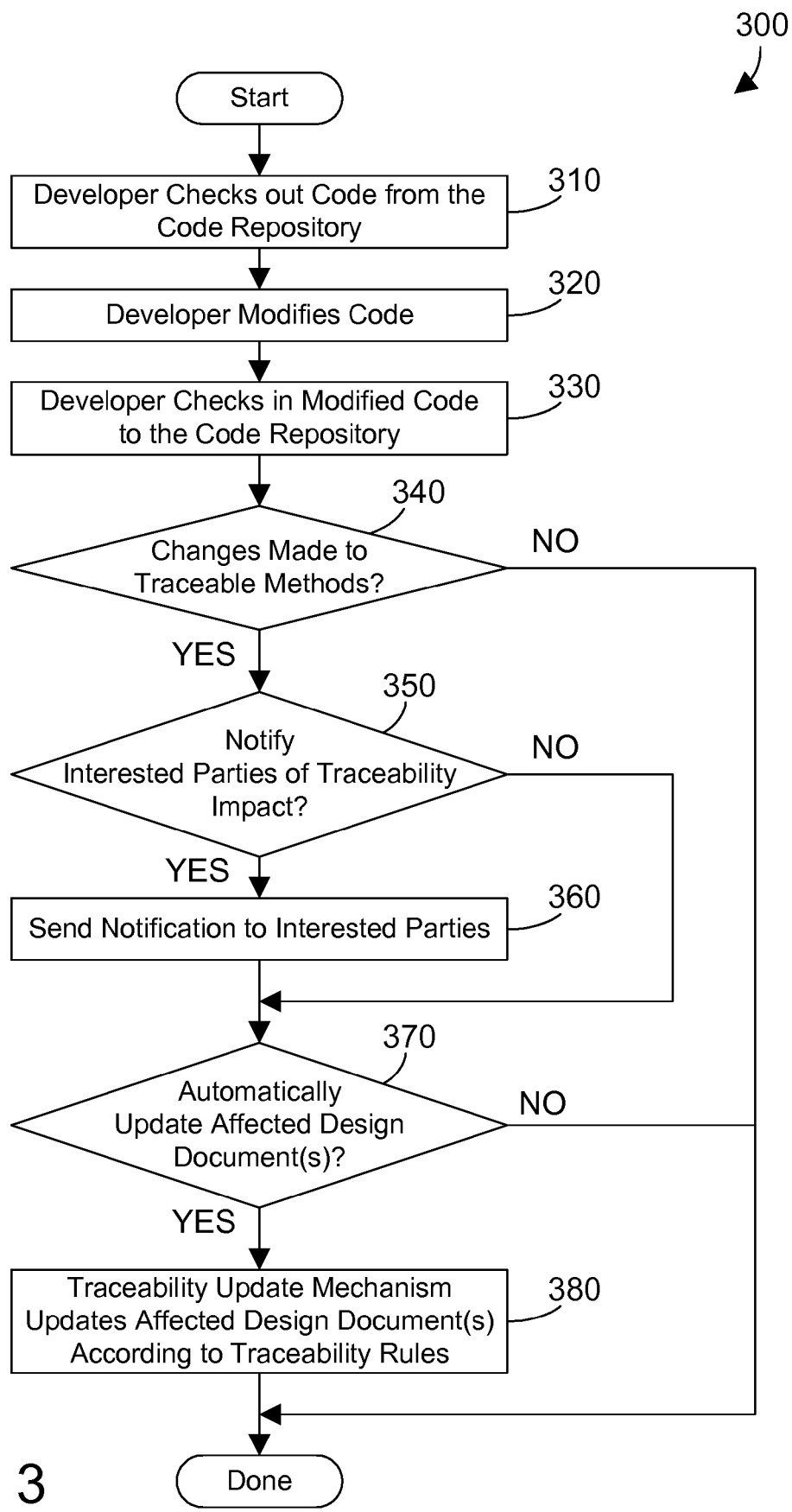
FIG. 3 is a flow diagram of a method for monitoring changes to code and performing one or more functions in response to the changes to the code.
Figure 4:
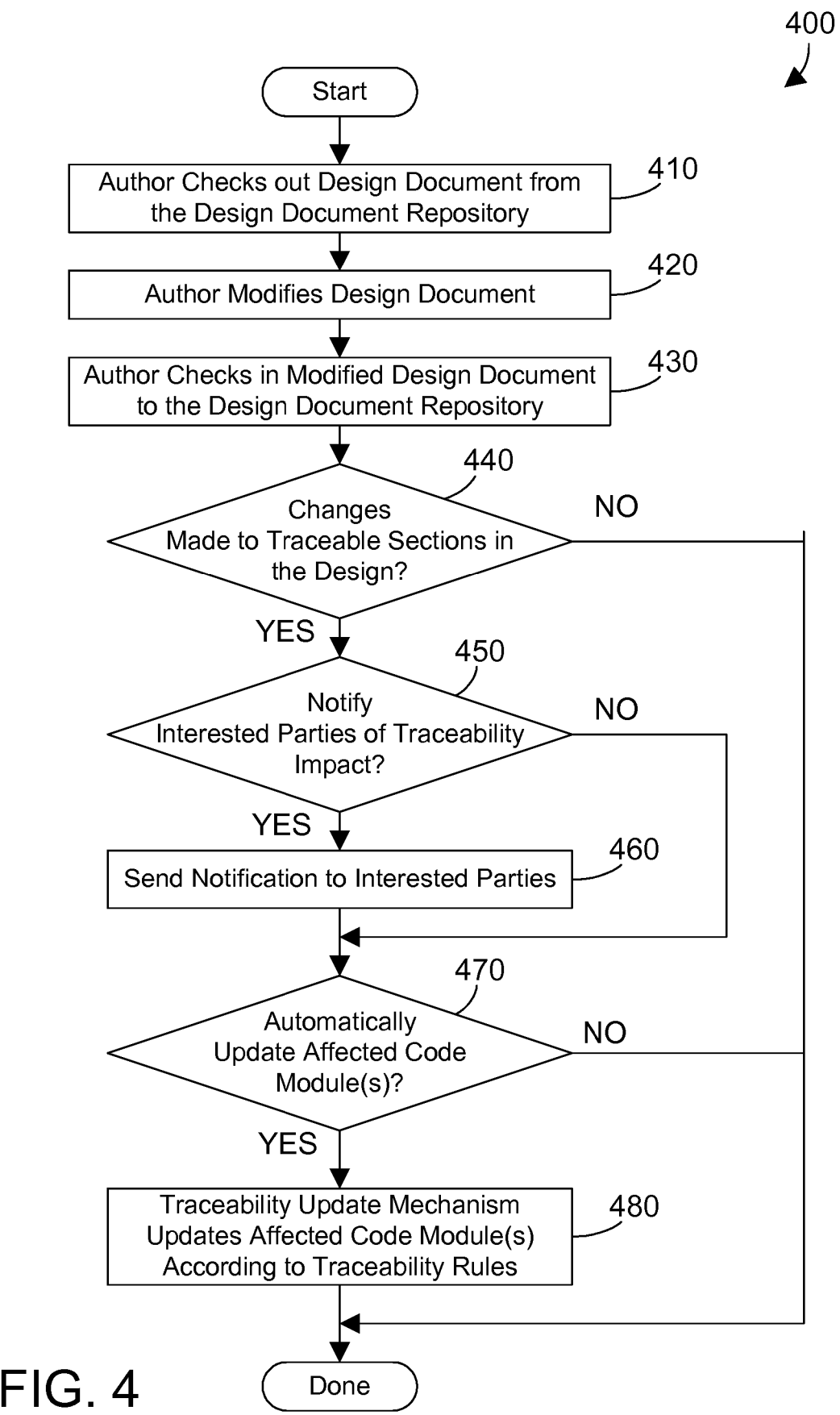
FIG. 4 is a flow diagram of a method for monitoring changes to a design document and performing one or more functions in response to the changes to the design document.

Two methods 300 in FIGS. 3 and 400 in FIG. 4 illustrate steps that may be performed by the traceability update mechanism 184 in networked computer system 100 in FIG. 1 and system 200 in FIG. 2. Referring to FIG. 3, a method 300 begins when a developer checks out code from the code repository (step 310). Referring to FIG. 2, a developer checks out code from the code repository 210 by checking out the code into the code generation environment 250. The developer modifies the code (step 320) in the code generation environment 250, then checks in the modified code to the code repository 210 (step 330). In step 330, when the changed code is checked in, the listener 220 detects that the code has changed and notifies the update detection mechanism 186 in the traceability update mechanism 184 of the change to the code. In response, the traceability update mechanism 184 reads the traceability rules 182 and traceability update policy 188 to determine if the changed code has corresponding design document(s) that need to be changed. If the changes were not made to traceable methods (step 340=NO), method 300 is done. Changes were made to traceable methods (step 340=YES) if any of the changed methods are listed in the traceability rules 182 as a method on a traceable object. If the traceability update policy 188 specifies to notify interested parties of the traceability impact of the change to the code (step 350=YES), the notification is sent to the interested parties (step 360). Note that "interested parties" may include both humans as well as automated processes that need to know when the code changes. If the traceability update policy 188 specifies not to notify interested parties of traceability impact of the change to the code (step 350=NO), the notification in step 360 is skipped. If the traceability update policy 188 specifies to automatically update affected design document(s) (step 370=YES), the traceability update mechanism 184 updates the affected design document(s) in the design document repository 230 according to the traceability rules 182 (step 380). If the traceability update policy 188 specifies not to automatically update affected design document(s) (step 370=NO), method 300 is done. Method 300 thus shows how changes to code may be automatically propagated to corresponding design documents in a content management system for computer software.

Referring to FIG. 4, method 400 begins when an author checks out a design document from the design document repository (step 410). In FIG. 2, this means the author checks out a design document from the design document repository 230 into the design document generation environment 270. The author then modifies the design document (step 420), and checks in the modified design document to the design document repository 230 (step 430). The listener 240 detects the changed design document when it is checked in, and notifies the update detection mechanism 186. If any changes were not made to traceable sections in the design (step 440=NO), method 400 is done. Changes were made to the traceable sections in the design (step 440=YES) if any of the changed sections in the design document are listed in the traceability rules 182 as traceable sections. If the traceability update policy 188 specifies to notify interested parties of traceability impact of the change to the design document (step 450=YES), the notification is sent to the interested parties (step 460). Again, "interested parties" may include both humans as well as automated processes that need to know when the design document changes. If the traceability update policy 188 specifies not to notify interested parties of traceability impact of the change to the design document (step 450=NO), the notification in step 460 is skipped. If the traceability update policy 188 specifies to automatically update affected code (step 470=YES), the traceability update mechanism 184 updates the affected code in the code repository 210 according to the traceability rules 182 (step 480). If the traceability update policy 188 specifies not to automatically update affected code (step 470=NO), method 400 is done. Method 400 thus shows how changes to design documents may be automatically propagated to corresponding code in a content management system for computer software.

A simple example is now provided to illustrate the concepts discussed above. Referring to FIG. 5, sample code 500 is a definition of a Java interface called DocumentInterface. Code 500 is one suitable example for a Java interface 212 shown in FIG. 2. A sample design document 600 in FIG. 6 corresponds to the code 500 in FIG. 5. The design document 600 in FIG. 6 is one suitable example for a design document 232 in FIG. 2. The correspondence between the code 500 in FIG. 5 and the design document 600 in FIG. 6 is shown in the sample traceability rules 700 shown in FIG. 7, which represents one suitable implementation for traceability rules 182 in FIGS. 1 and 2. The method tags not only identify the methods in the code, but also identify the mapping from the methods in the code to the corresponding portions of the design document. The "traceTo" elements in rules 700 shows the mapping between the code and design document. The methods public void checkouts, public void checkin( ), and public InputStream getContent( ) are shown as traceable methods in the code that are mapped to corresponding portions of the design document. These portions of the design document are shown within the Design tag, and define traceable objects in the design document that are mapped to corresponding methods in the code.

A sample traceability update policy 800 in FIG. 8 includes one or more criteria that governs the operation of the traceability update mechanism 182 in FIGS. 1 and 2. Sample policy 800 specifies to send notifications to interested parties at 810, to automatically update corresponding design or code sections at 820, and to indicate traceable objects via the plug-in during the drafting of code or design documents at 830. With the sample items shown in FIGS. 5-8, we now consider how a change is handled in FIGS. 9-12.

Referring to FIGS. 9 and 10, we assume the sample code 500 in FIG. 5 is checked out of the code repository 210 into the code generation environment 250, and is changed to include added comment at 910 and a changed method call at 920. The changes are monitored by the plug-in 260 to assure the changes conform to the traceability rules 700. Because the change was not mapped to the design via the traceability rules, only the method name is mapped between the code and design. When this code is checked back into the code repository 210, the listener 220 detects the change and notifies the traceability update mechanism 184 of the changes to the code. In response, the traceability update mechanism 184 reads the traceability rules 700 and determines at 710 that the getContent( ) method that was changed corresponds to the getContent_design portion of the design document. Notifications of the change to the code are sent to interested parties because entry 810 in the sample policy 800 is YES. In addition, the traceability update mechanism 184 automatically makes a corresponding change to the design document 600 by replacing the method getContent( ) with getContentStream( ) at 1010 in FIG. 10. Note the comment that was added at 910 in FIG. 9 does not create a corresponding change in the design document because the change was a comment, not a change to the code itself. This simple example shows how a change to the code can be automatically propagated to a corresponding design document.

Referring to FIGS. 11 and 12, we now assume the design document 600 in FIG. 6 is checked out of the design document repository 230 in FIG. 2 into the design document generation environment 270. The author makes a change to the design by adding "new and improved" at 1110 and by renaming the getContent( ) method to getContentStream2( ) at 1120 in FIG. 11. The change is monitored by the plug-in 280 to assure the changes conform to the traceability rules 700. When the design document 600 is checked back into the design document repository 230, the listener 240 detects the change, and notifies the traceability update mechanism 184 of the change. In response, the traceability update mechanism 184 reads the traceability rules 700 and determines at 720 the getContent_design portion of the design document that was changed corresponds to the getContent_code shown at 710, which includes the getContent( ) method. Notifications of the change to the design document are sent to interested parties because entry 810 in the sample policy 800 is YES. In addition, the traceability update mechanism 184 automatically makes a corresponding change to the code 500 by replacing the method getContent( ) with getContentStream2( ) at 1210 in FIG. 12. This simple example shows how a change to a design document can be automatically propagated to the corresponding code.

The content repository disclosed herein provides an automated way to keep code and design documents for computer software up-to-date as changes are made to both. By notifying interested parties of changes and automatically propagating changes in code to a corresponding design document, and by automatically propagating changes to a design document to corresponding code, the process of updating a computer program is performed in an automated manner that provides full traceability of changes made to both the code and the corresponding design documents.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

What is claimed is:

1. An apparatus comprising:
   at least one processor;
   a memory coupled to the at least one processor; and
   a content management system residing in the memory and executed by the at least one processor, the content management system comprising:
      a code repository;
      a design document repository that includes a plurality of design documents that each specify design for corresponding code in the code repository;
      traceability rules that specify traceable methods in the code, wherein all methods in the code that are not traceable methods are non-traceable methods;
      a traceability update mechanism residing in the memory and executed by the at least one processor, the traceability update mechanism detects a change in code in the code repository, determines from the traceability rules traceable methods in the code and non-traceable methods in the code, determines whether the change to the code in the code repository is a change to a traceable method, and when the change to the code in the code repository is a change to a traceable method, determining at least one design document in the design document repository that corresponds to the changed code in the code repository, reads a traceability update policy to determine a first action to perform when the change in the code is detected and to determine whether to indicate the traceable methods in a display to a user, and performs the first action when the change in the code is detected, and when the change to the code in the repository is a change to a non-traceable method, not changing any design document in the design document repository; and
      a plug-in that visually indicates in the display to the user the traceable methods in the code when the traceability policy specifies to indicate the traceable methods in the display to the user.

2. The apparatus of claim 1 wherein the first action comprises notifying at least one interested party of the change in the code.

3. The apparatus of claim 1 wherein the first action comprises automatically making at least one change to the at least one design document in the design document repository that corresponds to the changed code.

4. The apparatus of claim 1 wherein the traceability update mechanism further detects a change in a design document in the design document repository, determines from traceability rules code in the code repository that corresponds to the changed design document, reads a traceability update policy to determine a second action to perform when the change in the design document is detected, and performs the second action when the change in the design document is detected.

5. The apparatus of claim 4 wherein the second action comprises notifying at least one interested party of the change in the design document.

6. The apparatus of claim 4 wherein the second action comprises automatically making at least one change to the code in the code repository that corresponds to the changed design document.

7. A computer-implemented method executed by at least one processor for creating traceable changes in a content management system for computer software that includes code in a code repository and at least one design document in a design document repository, the method comprising the steps of:
   defining in traceability rules a first plurality of methods in the code as traceable methods, wherein all methods in the code that are not traceable methods are non-traceable methods;
   detecting a change in the code in the code repository;
   determining from the traceability rules whether the change to the code in the code repository is a change to a traceable method, and when the change to the code in the code repository is a change to a traceable method, performing the steps of:
      determining at least one design document in the design document repository that corresponds to the changed code in the code repository;
      reading a traceability update policy to determine a first action to perform when the change in the code is detected and to determine whether to indicate the traceable methods in a display to a user; and
      performing the first action when the change in the code is detected;
   when the change to the code in the repository is a change to a non-traceable method, not changing any design document in the design document repository; and
   visually indicating in the display to the user the traceable methods in the code when the traceability rules specify to indicate the traceable methods in the display to the user.

8. The method of claim 7 wherein the first action comprises the step of notifying at least one interested party of the change in the code.

9. The method of claim 7 wherein the first action comprises the step of automatically making at least one change to the at least one design document in the design document repository that corresponds to the changed code.

10. The method of claim 7 further comprising the steps of:
    detecting a change in a design document in the design document repository;
    determining from traceability rules code in the code repository that corresponds to the changed design document;
    reading a traceability update policy to determine a second action to perform when the change in the design document is detected; and
    performing the second action when the change in the design document is detected.

11. The method of claim 10 wherein the second action comprises notifying at least one interested party of the change in the design document.

12. The method of claim 10 wherein the second action comprises automatically making at least one change to the code in the code repository that corresponds to the changed design document.

13. A method for deploying computing infrastructure, comprising integrating computer readable code into a computing system, wherein the code in combination with the computing system perform the method of claim 7.

14. A computer-implemented method executed by at least one processor for creating traceable changes in a content management system for computer software that includes code in a code repository and at least one design document in a design document repository, the method comprising the steps of:
    defining in traceability rules a first plurality of methods in the code as traceable methods, wherein all methods in the code that are not traceable methods are non-traceable methods, the traceability rules further specifying whether to indicate the traceable methods in a display to a user;

defining in the traceability rules a first plurality of design portions in a design document as traceable design portions, wherein all design portions in the design document that are not traceable design portions are non-traceable design portions, the traceability rules further specifying whether to indicate the traceable design portions in a display to a user;

detecting a first change in the code in the code repository;

determining from the traceability rules whether the change to the code in the code repository is a change to a traceable method, and when the change to the code in the code repository is a change to a traceable method, performing the steps of:

determining at least one design document in the design document repository that corresponds to the first changed code in the code repository;

reading a traceability update policy to determine whether to automatically make at least one change to the at least one design document in the design document repository that corresponds to the first changed code and to determine whether to indicate the traceable methods in the display to the user;

when the traceability update policy specifies to automatically make at least one change to the at least one design document in the design document repository that corresponds to the first changed code, automatically making the at least one change to the at least one design document;

when the traceability update policy specifies to indicate the traceable methods in the display to the user, visually indicating in the display to the user the traceable methods in the code;

when the change to the code in the repository is a change to a non-traceable method, not changing any design document in the design document repository;

detecting a second change in a design document in the design document repository;

determining from the traceability rules whether the second change in the design document is a change to a traceable design portion, and when the change in the design document is a change to a traceable design portion, performing the steps of:

determining code in the code repository that corresponds to the second changed design document;

reading a traceability update policy to determine whether to automatically make at least one change to the code in the code repository that corresponds to the second changed design document and to determine whether to indicate the traceable design portions in the display to the user;

when the traceability update policy specifies to automatically make at least one change to the code in the code repository that corresponds to the second changed design document, automatically making the at least one change to the code; and when the traceability update policy specifies to indicate the traceable design portions in the display to the user, visually indicated in the display to the user the traceable design portions in the design document;

when the second change in the design document is a change to a non-traceable design portion, not changing any code in the code repository.

15. An article of manufacture comprising software residing on a computer-readable recordable medium, the software comprising:

a content management system comprising:

a code repository;

a design document repository that includes a plurality of design documents that each specify design for corresponding code in the code repository;

traceability rules that specify traceable methods in the code, wherein all methods in the code that are not traceable methods are non-traceable methods;

a traceability update mechanism residing in the memory and executed by the at least one processor, the traceability update mechanism detects a change in code in the code repository, determines from the traceability rules traceable methods in the code and non-traceable methods in the code, determines whether the change to the code in the code repository is a change to a traceable method, and when the change to the code in the code repository is a change to a traceable method, determining at least one design document in the design document repository that corresponds to the changed code in the code repository, reads a traceability update policy to determine a first action to perform when the change in the code is detected and to determine whether to indicate the traceable methods in a display to a user, and performs the first action when the change in the code is detected, and when the change to the code in the repository is a change to a non-traceable method, not changing any design document in the design document repository; and a plug-in that visually indicates in the display to the user the traceable methods in the code when the traceability policy specifies to indicate the traceable methods in the display to the user.

16. The article of manufacture of claim 15 wherein the first action comprises notifying at least one interested party of the change in the code.

17. The article of manufacture of claim 15 wherein the first action comprises automatically making at least one change to the at least one design document in the design document repository that corresponds to the changed code.

18. The article of manufacture of claim 15 wherein the traceability update mechanism further detects a change in a design document in the design document repository, determines from traceability rules code in the code repository that corresponds to the changed design document, reads a traceability update policy to determine a second action to perform when the change in the design document is detected, and performs the second action when the change in the design document is detected.

19. The article of manufacture of claim 18 wherein the second action comprises notifying at least one interested party of the change in the design document.

20. The article of manufacture of claim 18 wherein the second action comprises automatically making at least one change to the code in the code repository that corresponds to the changed design document.

\* \* \* \* \*